H. C. BAINES.
TRACTOR.
APPLICATION FILED FEB. 19, 1919.
1,389,851.
Patented Sept. 6, 1921.
4 SHEETS—SHEET 1.
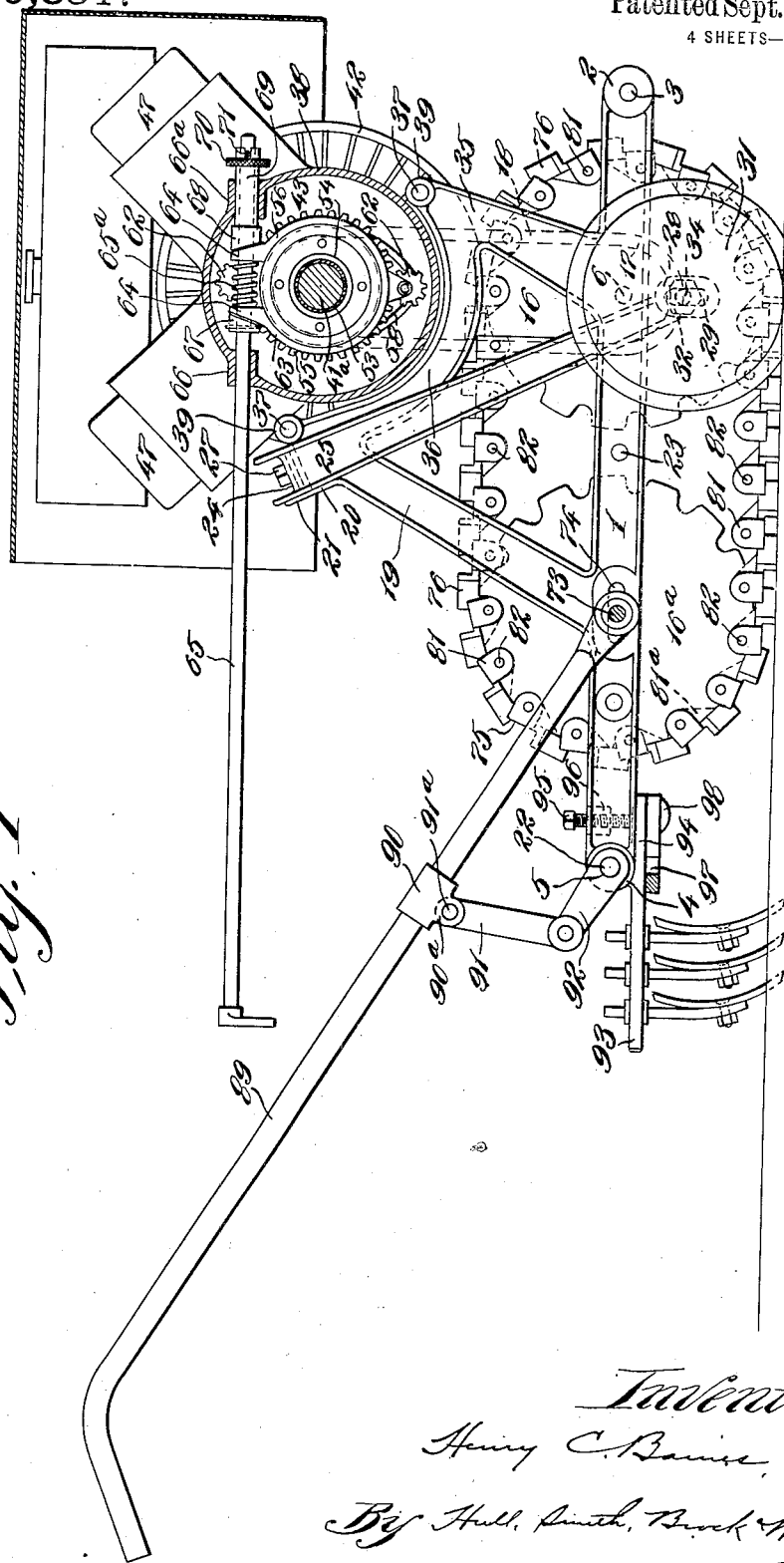

H. C. BAINES.
TRACTOR.
APPLICATION FILED FEB. 19, 1919.
1,389,851.
Patented Sept. 6, 1921.
4 SHEETS—SHEET 2.
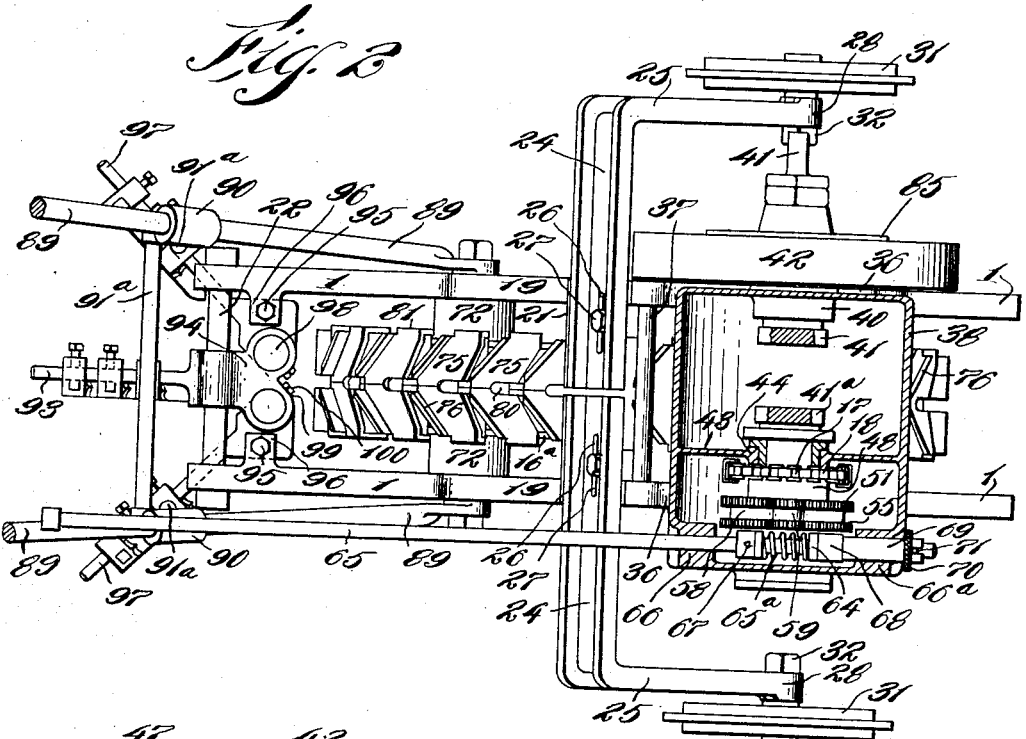
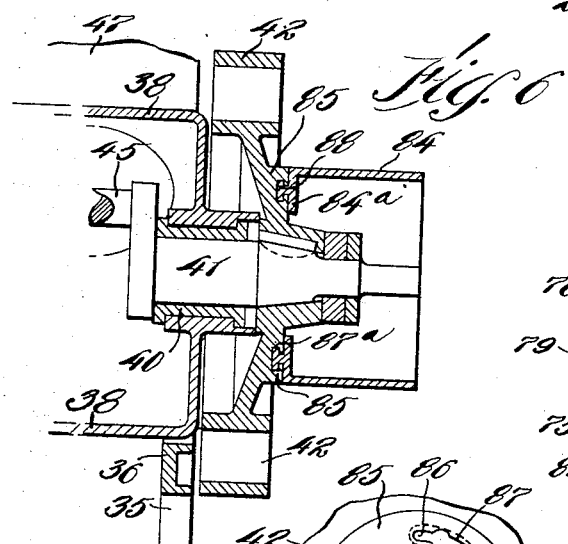
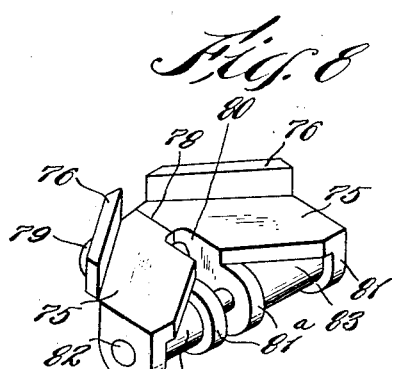
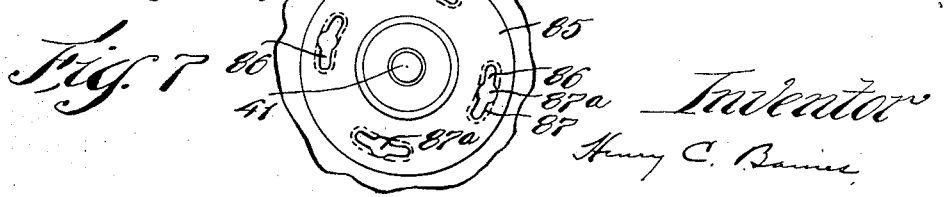

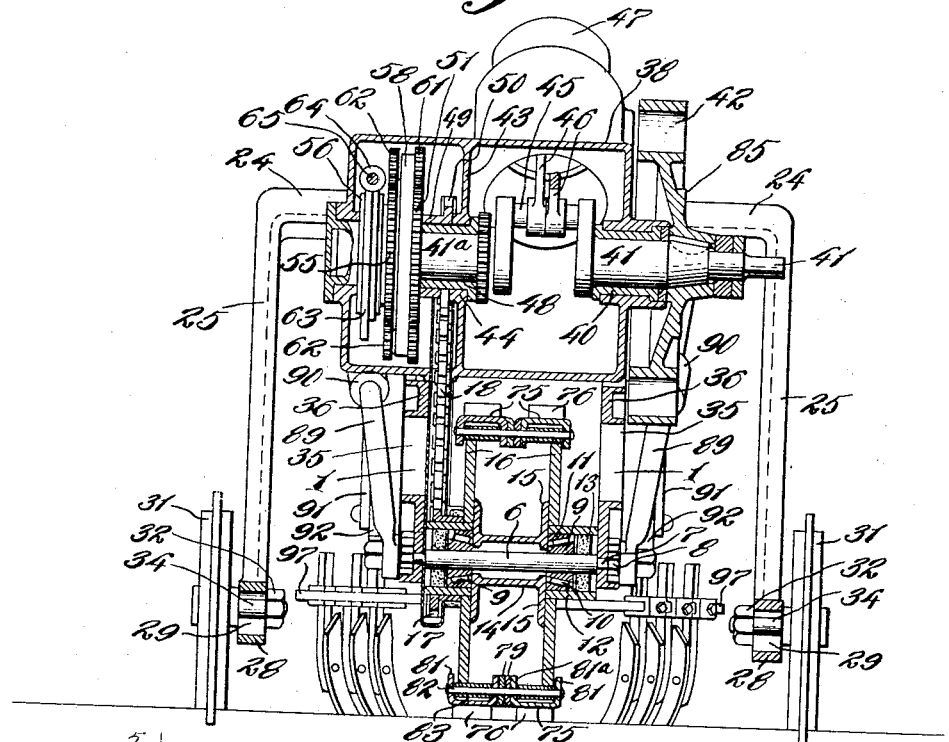
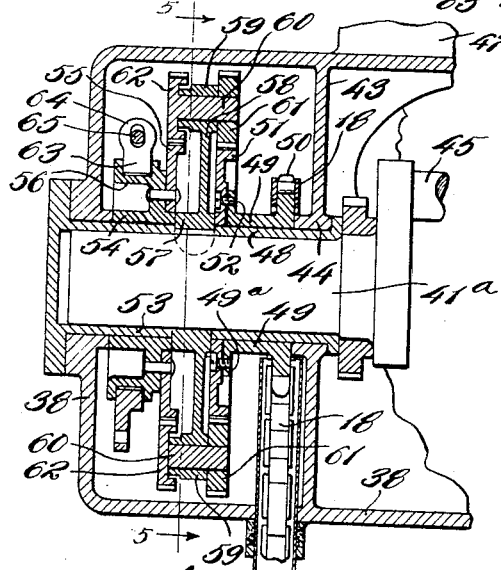
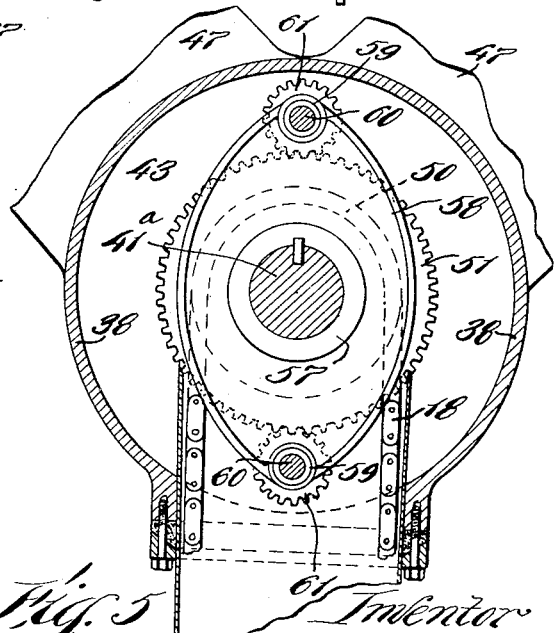

H. C. BAINES.
TRACTOR.
APPLICATION FILED FEB. 19, 1919.

1,389,851.

Patented Sept. 6, 1921.
4 SHEETS—SHEET 4.

Inventor
Henry C. Baines,
By Hull, Smith, Brock & West
Attys.

UNITED STATES PATENT OFFICE.

HENRY C. BAINES, OF EAST CLEVELAND, OHIO, ASSIGNOR TO THE BAINES ENGINEERING COMPANY, OF CANAL DOVER, OHIO, A CORPORATION OF OHIO.

TRACTOR.

1,389,851.     Specification of Letters Patent.      Patented Sept. 6, 1921.

Application filed February 19, 1919. Serial No. 278,041.

*To all whom it may concern:*

Be it known that I, HENRY C. BAINES, a subject of the King of England, residing at East Cleveland, in the county of Cuyahoga and State of Ohio, have invented a certain new and useful Improvement in Tractors, of which the following is a full, clear, and exact description, reference being had to the accompanying drawings.

This invention relates to tractors of the caterpillar type, or track-laying type, and more particularly to tractors of this character that are adapted for light work, such as the propulsion of cultivator blades and other implements. It is a general purpose and object of the invention to provide a tractor of this type with an efficient frame construction for the support of the motor and other parts and with an efficient means for transmitting power to the tread or track from such motor; also to provide for such tractors a novel construction of sprockets as well as a convenient construction and arrangement of parts for stabilizing such tractors.

Figure 9:
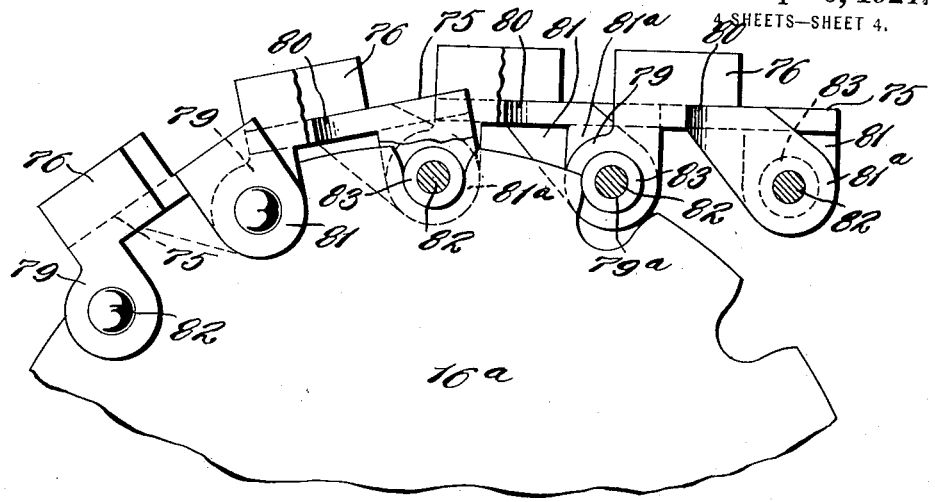
Figure 10:
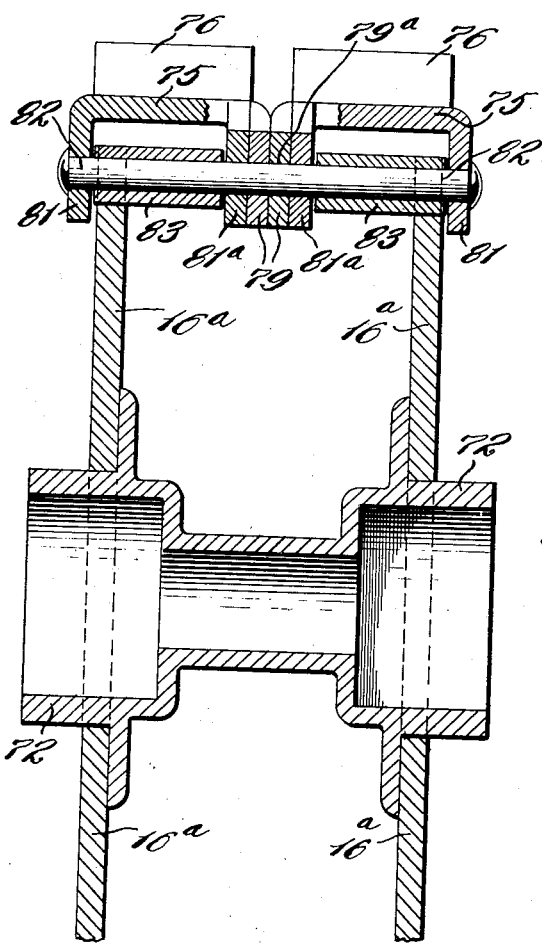

In the drawings forming part hereof, Figure 1 represents a side elevation of a tractor constructed in accordance with my invention; Fig. 2 a sectional plan view of the same; Fig. 3 a vertical sectional view (certain parts being shown in elevation) through the front portion of the tractor shown in the preceding views; Fig. 4 a sectional detail through the power transmitting mechanism; Fig. 5 a detail in section corresponding to the line 5—5 of Fig. 4; Fig. 6 a sectional detail through the flywheel, illustrating the manner of applying a driving pulley thereto; Fig. 7 a detail in elevation of the flywheel; Fig. 8 a detail in perspective of one of the links of the tread or track; Fig. 9 a detail in elevation of one of the sprocket wheels and a coöperating portion of the tread or track; Fig. 10 a detail in section of said sprocket wheel and tread or track; and Fig. 11 a detail in plan of the said tread or track.

The tractor comprises a framework for supporting the various parts thereof. Of this framework 1 denotes a pair of horizontal side members, preferably of the channel type and each provided at its front end with a boss 2 having an eye 3 and at its rear end with a similar boss 4 having an eye 5. The eyes provide means whereby the implement support may be conveniently applied to the frame. Near their front ends, the side members 1 support a fixed shaft or spindle 6, the shaft being shown as provided with reduced ends 7 extending through the members 1 and provided with nuts 8 threaded onto their outer ends. Mounted upon the shaft 6 and preferably rigid therewith are the tapered bearings 9. These bearings provide supports for the rollers 10 interposed between the same and the outer tapered bearings 11 carried by the hub section 12. Surrounding the portions of the shaft located externally of the bearings 9 is absorbent material 13 affording convenient means for excluding dust from the rollers and bearings. The hub sections are connected by a central sleeve 14 and are provided each with a circular flange 15 providing means for securing the disks 16 of the front sprocket wheel to said hub section. Between a sprocket disk 16 and the frame 1, one of the hubs is shown as provided with a sprocket wheel 17 by means of which and a chain 18 power may be transmitted from the motor shaft to the sprocket 16, Projecting forwardly and upwardly from each side member 1 is an inclined brace 19, which may also be of channel shape and which may be formed integral with the side member. At their upper ends, the braces 19 are connected by a cross member 20 providing an upwardly and forwardly inclined seat having an upwardly and rearwardly extending flange 21 projecting above said seat. The rear ends of the side members 1 are connected by a shaft 22 and the intermediate portions thereof by a cross bar 23. The seat 20 and flange 21 serve to support the stabilizer frames. Each of these frames comprises a horizontal portion 24 and a downwardly and forwardly projecting portion 25, each frame being shown as of commercial iron or steel of channel shape. For the purpose of securing the stabilizer frames in proper adjusted relation to the side frames and the tread or track sprockets, the web of such frame may be slotted, as shown at 26, for the reception of a clamping bolt 27 threaded into the seat 20 and having a head adapted to engage the web of the coöperating stabilizer frame. Each of these frames is shown as provided with a journal 28 at the lower end thereof, each journal having a vertical slot 29 therein in which the shaft 34 of the stabilizer wheel 31 may be clamped, as by means of a nut 32. The construction described provides a convenient means for moving the stabilizer wheels toward and from the side frames and the tread sprockets, thereby to sustain the tractor in an upright position as well as to accommodate it to various kinds of work, enabling the wheels to operate without injury to the crops.

Projecting upwardly and forwardly from the front portion of each side frame is a brace 35, the said braces being connected to the braces 19 by means of curved channel members 36, the members 36 providing a cradle for the motor. The frames 36 are connected at their ends by transverse bolts or rods 37.

38 denotes a motor housing which may be conveniently supported from the cradle by means of projections 39 rigid therewith and through which the bolts or rods 37 extend. One end of the housing is provided with a bearing 40 for the corresponding end 41 of the crank shaft, this end of the crank shaft being shown as provided with a fly wheel 42, the details of which will be described hereinafter. 43 denotes a web within the housing and provided with a central bearing 44 for the opposite portion 41ª of the crank shaft, the said portions of the crank shaft being connected by the crank pin 45, and said pin being shown as operatively connected with the connecting rods 46 of a two-cylinder, air-cooled motor, the cylinders being indicated at 47. Surrounding the shaft section 41ª is the journal sleeve 48 and loosely mounted upon said sleeve is a hub 49 having a sprocket 50 thereupon. The sleeve 49 is secured to a gear 51 by means of a flange 49ª and one or more bolts 52. At its outer end, the shaft section 41ª is supported by a journal sleeve 53 having thereon a sleeve 54 to which there is secured a gear 55. The sleeve 54 carries a clutch drum 56 and the gear 55 is shown as secured to the side of said drum. Keyed to the shaft section 41ª between the gears 51 and 55 is a hub 57 having oppositely extending arms 58 each provided with a bearing 59 in its outer end, each bearing supporting a shaft 60 to which are secured the pinions 61 and 62 adapted to mesh respectively with the gears 51 and 55. One of the gears 51, 55, will be a greater pitch than the other. The gears and pinions are so proportioned that with one of the gears held against rotation, each revolution of the shaft will cause a comparatively slight rotary movement of the loose gear. The sprocket 50 is connected by means of the chain 18 to the sprocket 17. With the gear 55 held against rotation, the rotation of the crank shaft will cause the sprockets 16 and the tread or track coöperating therewith to be driven. If, for any reason, it is desired to allow the motor to idle, the clutch (to be described hereinafter) can be released from the drum 56; the resistance to the rotation of the gear 51 through the engagement of the tread with the ground will prevent the said gear from rotating, but the gear 55 and the parts connected therewith will be driven slowly in the reverse direction.

The clutch is shown in Fig. 1 and comprises a brake band 63 applied to the drum 56, the ends of said band being spaced apart at the top of the drum and each having a beveled surface 64 adapted to be operated by a pair of cams upon a shaft 65 rotatably mounted in bearings 66, 66ª in the housing 38. One of the cams 67 is pinned to the shaft 65 while the other cam 68 is slidably keyed upon the shaft. In order to compensate for wear, a sleeve 69 is shown as threaded upon the front end of the shaft 65 and extending through the bearing 66ª and is provided with a knurled hand grip 70. It will be evident that, by threading the sleeve 69 along the shaft 65, the relative positions of the cams 67 and 68 may be varied to compensate for wear; also that, by rotating the shaft 65, the cams will serve to clamp the brake bands 63 to the drum thereby to prevent rotation of the same. The end of the sleeve 69 is shown as slotted, for the purpose of receiving a pin 71 to hold it in its various adjusted positions upon the shaft 65.

From the foregoing, it will be evident that, by proper manipulation of the shaft 65, the rotation of the crank shaft may be transmitted to the hub sections 12 and therefrom to the front sprockets 16. A spring 65ª interposed between the projecting ends of the brake band and surrounding the shaft 65 tends to loosen the band upon the drum.

Coöperating with the front sprockets 16 are the rear sprockets 16ª which are mounted upon a hub 72 journaled upon a spindle 73 mounted in horizontal slots 74 in the frames 1, this mounting enabling the sprockets 16ª to be adjusted to compensate for wear of the track or tread, which will now be described.

The track or tread is of the chain type and consists of a plurality of links which are flexibly connected together and which are provided with rollers for engaging the teeth of the sprockets. Each link comprises a pair of flat tread plates 75 each having an inclined tractor lug 76 projecting from the front end thereof. The front and the rear of each plate 75 are preferably inclined inwardly and forwardly, and the inclined tractor lug 76 projects from such inclined front edge.

Figure 11:
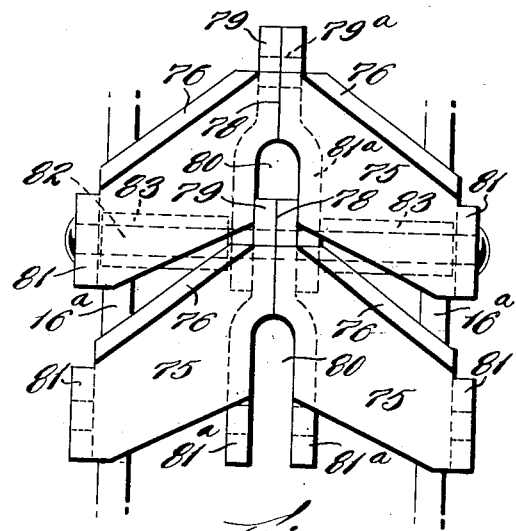

As it will appear from Figs. 8 and 11, each link comprises two such plates 75, and these plates are adapted to abut at their inner edges as indicated at 78, each plate being provided with a projection 79 and said projections also being adapted to abut at their inner faces, these projections extending forwardly between and beyond the lugs 76. Each plate 75 has a recess extending forwardly from the rear inner end thereof, the recesses of two such plates providing a pocket 80 for the reception of the inwardly projecting lugs 79 on the link next behind. Depending from the inner and the outer rear portion of each plate 75 is a journal lug 81, 81ª, the inner lugs 81ª being spaced apart beneath the pocket 80. Through the four lugs carried by each pair of plates 75 there projects a pintle 82. Rollers 83 are applied to said pintle between each pair of lugs 81, 81ª. The links are connected by inserting the projections 79 of a rear link into the pocket 80 of the link next in front thereof and then inserting the pintle in place, the projections 79 having openings 79ª for the reception of said pintle.

The sprocket disks are provided with teeth adapted to coöperate with the rollers 83, the front sprockets being driven in the manner hereinbefore described and the rear sprockets forming supports and guides for the tread or track in the usual manner.

Reference has been made hereinbefore to the fly wheel. This fly wheel is so constructed as to permit of the convenient application thereto of a drive pulley, indicated at 84—see Fig. 6. Formed with the fly wheel is a boss 85 having a plurality of arcuate recesses 86 therein. Four such recesses are shown, having their centers approximately 90 degrees apart. The outer wall of the boss is provided with arcuate slots 87, each slot communicating with a recess and being provided at its central portion with enlargements 87ª for the reception of the head 88 of a stud. Four such studs will be secured to a flange 84ª on the pulley, being conveniently riveted thereto. With the parts constructed and arranged as described, the pulley may be conveniently applied to the fly wheel by merely inserting the heads 88 through the enlarged portions of the slots and then turning the pulley in one direction or the other, according to the direction in which the crank shaft is to be driven. The pulley may be conveniently removed by turning the same until the heads of the studs register with the enlargements of the slots.

Handles 89 are shown as pivotally connected to the side frames 1; the front ends of said handles may be conveniently mounted upon the spindle 73 which supports the sprockets 16ª. A split sleeve 90 having lugs 90ª is mounted on each handle. A pair of links 91 are each pivotally supported between each pair of lugs 90ª upon the bolts 91ª the lower ends of said links being pivotally connected to links 92 each having its lower end connected to the cross bar 22 journaled in the eyes 5; the cross bar may be angular between these journals, whereby the links 92 may be rigidly connected therewith. It will be evident that by raising or lowering the handles a rotary movement will be imparted to the cross bar or shaft 22. The purpose of rotating the cross bar 22 is to impart movement thereby to the implement support or supports. With this object in view, the central portion of the cross bar is provided with an implement supporting bar 93 having a forwardly projecting bracket 94 rigid therewith. The front of the bracket is extended laterally whereby it is adapted to coöperate with stop bolts 95 carried by lugs 96 projecting inwardly from the side frames 1 above said bracket. The stop bolts serve to limit the downward movement of the rear portion of the support 93, and hence depth to which the cultivator or other implement teeth may penetrate the soil. Two additional supports for such teeth are indicated at 97 and are each pivotally connected to the bracket 94 on the vertical bearings 98. The front end of each carrier 97 is shown as projecting beyond its bearing and as extending beneath a curved slot 99 in the front portion of the bracket, being secured in any desired angular relation with respect to the bracket and the support 93 by means of a bolt 100 threaded into an aperture in said carrier and having a head adapted to engage the walls of the slot.

By the construction described, it will be evident that, by adjustment of the bolts 95, the penetration of the implement teeth secured to the supports 93 and 97 may be varied; that, by means of the journals 98, bolts 100 and slots 99, the angular arrangement of the implement supports may also be varied as desired; that, by lifting upon the handles 89, the front of the bracket 94 may be depressed through the straightening of the toggle levers, thereby to lift the teeth on the supports 93 and 97 out of the soil; and that, by further lifting of the handles, the tractor may be pivoted upon the front sprocket wheels, to facilitate the turning operation.

The adjustable connection between the links 91 and the handles 89, afforded by the sleeves 90, enables the handles to be raised, and lowered to accommodate differences in height of the operators.

Having thus described my invention, what I claim is:—

1. The combination, with a motor shaft, of a sprocket on said shaft, connections between said shaft and said sprocket for driving the latter at a speed different from that of said shaft, a pair of tractor tread sprockets, a tread or track on the last mentioned sprockets, a hub on one of the last mentioned sprockets, a sprocket on said hub, and a chain on the first and last mentioned sprockets.

2. The combination, with a framework, of a motor supported thereby, a pair of tractor sprockets supported by said framework, a driving connection between one of said sprockets and said motor, a tread or track upon said sprockets, a pair of stabilizing wheels, and a support for each wheel adjustably connected to said framework.

3. The combination, with a pair of side frames, of a motor supported thereby, a pair of tractor sprockets interposed between and supported by said frames, a driving connection between one of said sprockets and said motor, a tread or track upon said sprockets, a pair of stabilizing wheels, and a support for each wheel adjustably connected to said side frames.

4. The combination, with a pair of side frames, of a motor supported thereby, a pair of tractor sprockets interposed between and supported by said frames, a driving connection between one of said sprockets and said motor, a tread or track upon said sprockets, a transverse supporting member connecting said frames, a pair of stabilizing wheel supports adjustably mounted on said member, and means for securing said supports to said member.

5. The combination, with a pair of side frames, of a motor supported thereby, a pair of tractor sprockets interposed between and supported by said frames, a driving connection between one of said sprockets and said motor, a tread or track upon said sprockets, an upwardly inclined brace carried by each side frame, a transverse flanged member connecting the upper ends of said braces, a pair of stabilizing wheel supporting members slidably mounted upon the said flanged member, and means for securing the said supports to the said member.

6. The combination with a motor shaft, of a pair of tractor tread sprockets, a tread or track on said sprockets, a gear on said shaft, connections between said shaft and gear for driving the latter at a speed different from said shaft, and a driving connection between said gear and one of the tractor tread sprockets.

7. The combination with a motor shaft, of a pair of gears thereon and rotatable with respect thereto, a pair of pinions rotatable with said shaft and meshing with said gears respectively, a brake connected with one of said gears, a pair of sprocket wheels, a tread or track thereon, and a driving connection between the other of said gears and one of said sprockets.

In testimony whereof, I hereunto affix my signature.

HENRY C. BAINES.